March 13, 1962 W. J. REAVIS ETAL Re. 25,133

SLIP COVERS

Original Filed Dec. 15, 1953 3 Sheets-Sheet 1

INVENTORS
WILLIAM J. REAVIS
ETHEL SCHUTTE
BY Klein & Hart
ATTORNEYS

SLIP COVERS

Original Filed Dec. 15, 1953 3 Sheets-Sheet 2

INVENTORS
WILLIAM J. REAVIS
BY ETHEL SCHUTTE
Klein + Hart
ATTORNEYS

SLIP COVERS

Original Filed Dec. 15, 1953 3 Sheets-Sheet 3

INVENTORS
WILLIAM J. REAVIS
BY ETHEL SCHUTTE
Klein & Hart
ATTORNEYS

United States Patent Office

Re. 25,133
Reissued Mar. 13, 1962

25,133
SLIP COVERS

William J. Reavis, Indianapolis, Ind., and Ethel Schutte, Baltimore, Md., assignors to S. & E. Manufacturing Company, Baltimore, Md., a corporation of Maryland Original No. 2,818,106, dated Dec. 31, 1957, Ser. No. 398,372, Dec. 15, 1953. Application for reissue May 5, 1959, Ser. No. 853,667
(Filed under Rule 47(a) and 35 U.S.C. 116)
10 Claims. (Cl. 297—225)

Matter enclosed in heavy brackets [ ] appears in the original patent but forms no part of this reissue specification; matter printed in italics indicates the additions made by reissue.

This invention relates to improvements in slip covers for upholstered chairs and the like.

Furniture of the indicated type is made in a variety of styles and sizes and by reason of the differences in the shapes of such furniture in the different styles and the differences in the sizes of any partciular style, it is difficult to provide a ready-made slip cover which will neatly and snugly fit the arm rests, seats and back portions of all of such styles. In fact, certain styles of chairs and sofas have never been able to be fitted satisfactorily with the ready-made woven slip covers heretofore made available by the art, so that owners of such furniture have been obliged to have their slip covers custom made.

It is the primary purpose of the present invention to provide an improved ready-made slip cover which is universally adaptable to satisfactorily fit any one of a number of styles of upholstered chairs and the like within a predetermined range of sizes of arm rests, seats and back portions of such chairs and with such closeness and smoothness as to provide a much better fit than ready-made slip covers have been so far able to achieve and approaching the perfection of a custom made slip cover.

Another object of the invention is to provide a ready-made slip cover which is so constructed that it can with equal facility smoothly and closely fit chair arms of many sizes and shapes.

A further object of the invention is to provide a ready-made slip cover which can be readily adusted to fit chair backs and seats of widely varying widths.

A still further object of the invention is to provide an improved ready-made slip cover which while possessing the aforesaid advantages, is of such simple construction that it may be made economically in large quantities, can be fitted on or removed from a piece of upholstered furniture with a minimum of effect and can be conveniently laundered by the housewife.

Other objects and advantages of the invention, as well as the novel features of construction thereof, will become apparent from a perusal of the following description, when read in connection with the accompanying drawings, in which FIG. 1 is a plan view of the body of a slip cover made in accordance with the invention and which covers the seat and back of the upholstered article;

Figure 3:
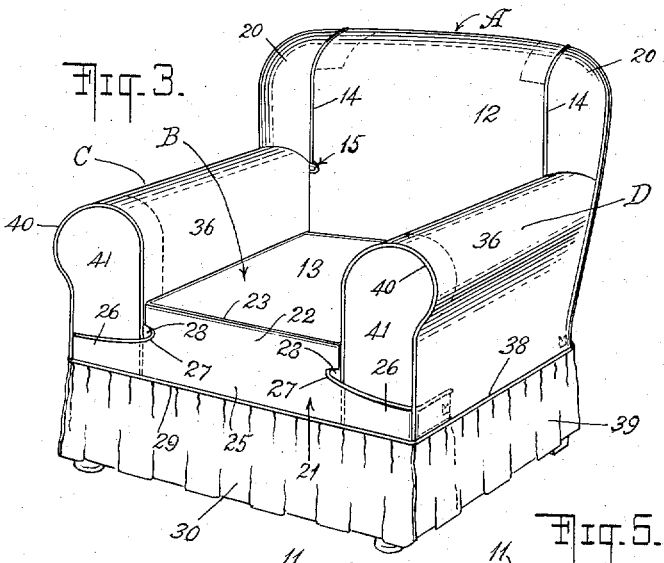
FIG. 3 is a perspective view of the front of an upholstered article to which a slip cover made in accordance with the invention has been applied.

Upholstered articles for which the cover of the instant invention was devised include a back A, a seat B, and arm rests C and D (note FIG. 3). The cover of the instant invention for an article having these components is composed of three parts, namely, a body portion for covering the seat and back of the article, and two arm portions for covering the arm rests of the article. The material utilized in the several parts of the cover may be an elastic or stretchable material, such as knitted material, or may be a non-stretchable woven fabric such as chintz, cretonne, linen and the like, or may be a combination of stretchable and non-stretchable fabrics. While in FIGS. 3 to 5 of the drawings, the slip cover has been depicted on an upholstered article known as a club chair for the purposes of illustration, it will be understood that the slip cover of this invention is also equally adaptable to cover Lawson, button-back, modern C, modern S, wing, Cogswell and T-club types of chairs. Certain modifications in the cover may be required to better adapt it to certain of such styles, as for instance, the wing chair, but the essential features of the invention will be present in all of such slip covers to obtain a smooth, close fit even though the chair may be large or small, tall or short, or wide or narrow.

Figure 4:
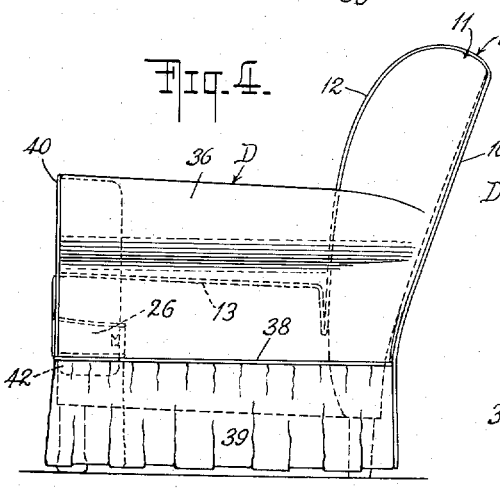
FIG. 4 is a side elevational view of the article and slip cover shown in FIG. 3.
Figure 5:
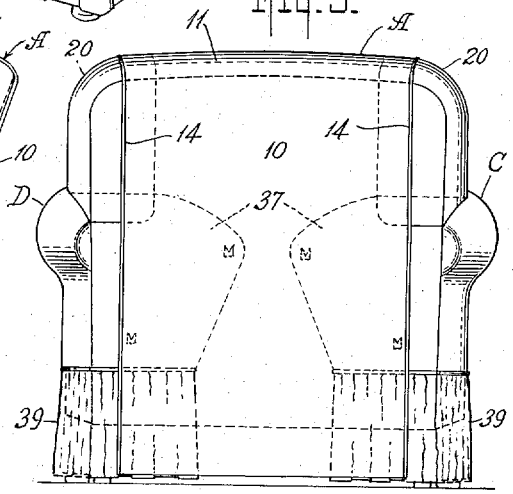
FIG. 5 is a rear elevational view of the article and slip cover shown in FIGS. 3 and 4.

As shown in FIGS. 1 and 3 to 5 of the drawings, the body portion of the cover is composed of an outside of the back panel 10 of substantially rectangular shape. Panel 10 has a length substantially equal to the height of the tallest chair for which the slip cover is designed and a width approximately as wide as the width of the narrowest chair back for which the slip cover is designed. The panel 10 is connected by a seam 11 to a panel portion 12 which covers the inside of the chair back above the arm rests C and D thereof. It will be noted in FIG. 1 of the drawings, that the side edges of the panel portion 12 incline outwardly from the seam 11. From the base or lower end of the panel portion 12 the body portion of the cover includes a panel portion 13, which covers the inside of the chair back in the region of the arm rests C and D and the seat B of the chair. Panel portion 13 is substantially rectangularly-shaped and has a width substantially greater than the width of pane 10 and sufficient to enable the side edges of such panel portion to be tucked in the spaces between the back A and the arm rests C and D, and in the spaces between the seat B and the arm rests C and D of the widest chair for which the slip cover was designed. The length of panel portion 13 is greater than the combined height of the tallest chair back for which the cover was designed and the depth of the seat B to provide additional material to be tucked in the space between the back A and seat B, as shown in FIG. 4 of the drawings. The side edges of panel 10 and panel portion 12 are provided with lines of welting 14, 14 which extend continuously throughout the combined lengths of such side edges.

Figure 6:
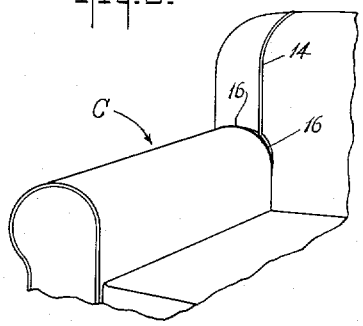
FIG 6 is partial perspective view showing the manner in which one feature of the invention is applied to a short length chair.
Figure 7:
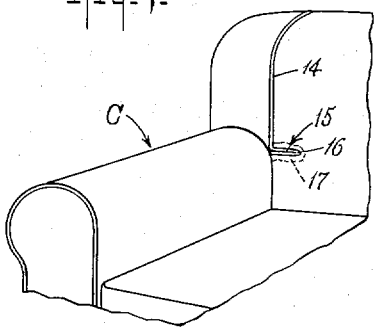
FIG. 7 is a view similar to FIG. 6 showing how such feature would be utilized on a longer chair.

At the juncture of panel portions 12 and 13, the material of which such panels are constituted is provided on each side with transverse slits 15, each approximately two inches in length. The entire inner edge of each slit 15 has secured thereto a line of welting 16. Secured to the inner edge of each slit 15 by means of the stitching attaching the line of welting 16 thereto is an elongated substantially rectangularly-shaped piece of fabric 17 similar to the facing material of which the panel portions 12 and 13 are formed. The construction constituting the slits 15, welting 16 and fabric 17 provide an expandable bellows on each side of the body portion at the tops of the arm rests C and D which enable panel portions 12 and 13 to snugly and closely fit the inside backs of articles which may differ at least four inches in length for the particular construtcion illustrated. The manner in which such bellows work in applying the cover to an article having a back of short length is illustrated more clearly in FIG. 6 of the drawings. As shown in such figure, the bellows is expanded so that the welting 16 thereof conforms to the curve of the arm rest C. In such application, the piece of fabric 17 is tucked in the space between arm rest C and the back A. If the back A is still shorter than illustrated, the welting 14 and the bellows will be shifted farther to the left, as viewed in FIG. 6 of the drawings. If the back A of the chair is longer than indicated in FIG. 6 of the drawings, the bellows will take the form indicated in FIG. 3 of the drawings, with the portion of the fabric 17 at the closed end of the bellows tucked beneath the panel portions 12 and 13. Should the back A be long enough, the expandable bellows will take the form illustrated in FIG. 7 of the drawings. In this application, the slits forming the bellows is completely closed with the two legs of the welting 16 in closed parallel relation and all of the fabric 17 tucked beneath the panel portions 12 and 13.

Secured to the side edges of panel portion 12 by means of the stitches connecting the lines of welting 14, 14 are two panels 20, 20 which together with panel 10 and panel portion 12 form coverings for the ends of the article back. The panels 20, 20 are in effect hinged to the panel portion 12 and have a width or dimension in the direction of the length of panel portion 12 substantially greater than the width of the ends of the article back A to enable the free side edge portions of such panels to be brought around to the rear of the back. It will be noted in FIG. 1 of the drawings that the panels 20, 20 are each connected at one end or side to an inclined side of panel portion 12 from the line of welting 16 of an expansible bellows upwardly a distance approximately the height of the back A above the arm rests, and thereafter for the remainder of the height of such panel 20 is free of panel portion 12. The height of each panel 12 is substantially greater than the height of the back A above the arm rests so that the upper free end portion of such panel may be brought over the top surface of the back A at an end thereof. The weltings 16, 16 which edge the slits 15, 15 of the expansible bellows are extended along the lower edges of the panels 20, 20 to the outer side edges of the latter. These extensions of the weltings 16, 16 preferably are inserted into and locked in the spaces between the back A and the tops of the arm rests C, D to lock the lower ends of panels 20, 20 in proper position on the article and to enable the portions of such weltings along the edges of the slits 15, 15 to be adjusted to correct position on a particular chair to be covered.

Figure 8:
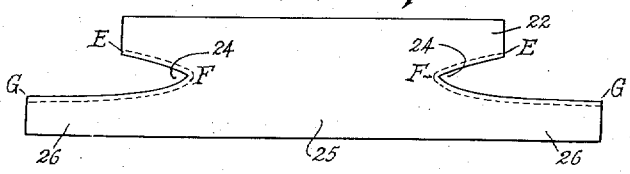
FIG. 8 is a plan view of one of the panels contained in the body portion of the cover.

Secured to the lower edge of panel portion 13 is the upper edge of a panel 21 which is formed to cover the front of the article seat B and to provide extensions to be extended around the sides of the article. As shown more clearly in FIGS. 1 and 3 of the drawings, panel 21 includes an upper section 22 having a width substantially the same as the width of panel portion 13 and connected at its upper edge to the panel portion 13 by a seam 23. Substantially centrally of its height, panel 21 has two substantially V-shaped cut-outs 24, 24 (note FIG. 8) which separate the upper section 22 from a lower section 25 having a length substantially greater than the length of section 22 and such as to provide two extensions 26, 26 which are drawn over the front faces of the arm rests C and D and around the side surfaces of the article. Connected to the edges F—G of panel 21 are lines of welting 27. Connected along one edge to edges E—F—G of such panel 21 are elongated substantially rectangularly-shaped strips 28 of a material similar to that of which panel 21 is formed. The outer end edges of strips 28 at the points G underlie and are secured by seams to the end edges of the extensions 26. The other end edge of strips 28 at the points E and the outer side edges of such strips are free. The inner ends of the cut-outs 24 and the welting 27 are spaced apart a distance (the distance F—F) slightly less (approximately one inch) than the length of the smallest seat for which the slip cover was designed, so that the junctures of attachment of the extensions 26, 26 with the main body of the cover is always between the arm rests of the article. This enables the extensions 26, 26 to move relative to the front panels of the arm coverings, as when a person sits on the seat of the article, and to come back to normal position after the weight has been removed from the seat without disturbing the front panels of the arm rest covers. The extensions 26 and the strips 28 enable the panel 21 to satisfactorily cover articles having seats from at least 6 to 8 inches longer than the shortest seat for which the slip cover was designed. In covering the longer seats, the strips 28 cover the exposed portions of the front of the seat and provide tuck-ins for securing panel 21 in proper position on the article. The lower edge of panel 21 is connected by a cord or welting 29 to a skirt panel 30 which extends the entire length of the lower edge of panel 21, so that it is connected to the lower edges of the extensions 26 thereof.

Figure 1:
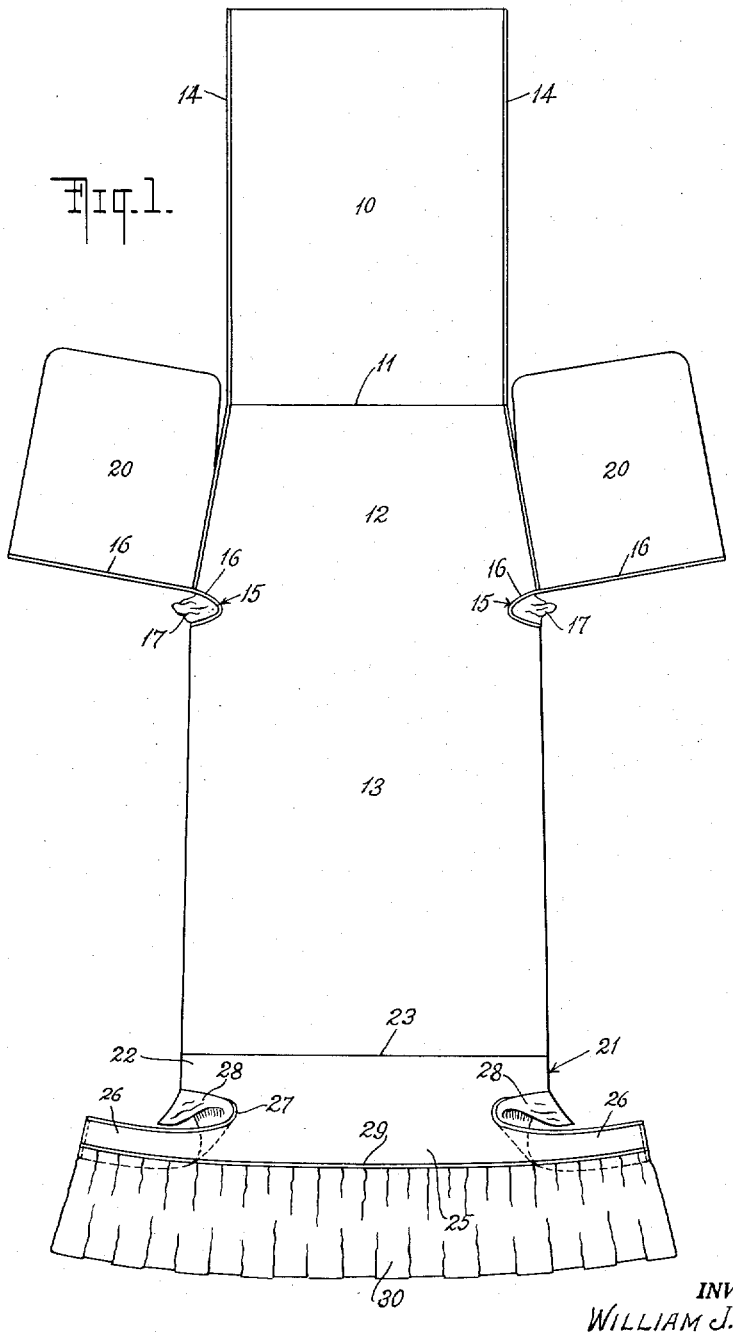
Figure 2:
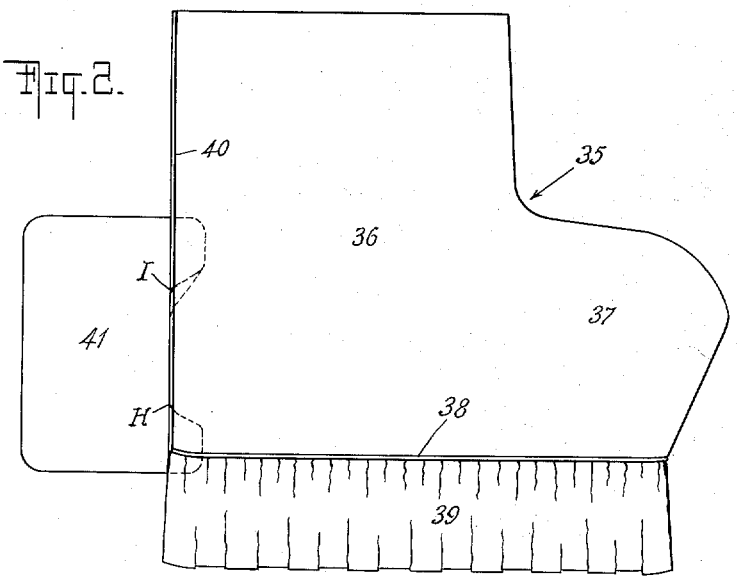
FIG. 2 is a plan view of one of the portions of the cover for covering an arm rest of the upholstered article.

The two coverings for the arm rests C and D of the article are similar in construction so that it is believed a description of one will suffice for both. Referring to FIG. 2 of the drawings which shows an arm rest cover for arm rest D, and to FIGS. 3 to 5 of the drawings, it will be noted that each arm rest covering is composed of a main irregularly-shaped panel 35 having a vertical portion 36, as viewed in FIG. 2, of a width substantially equal to the length or depth of an arm rest and a height greater than the combined heights of the outer and inner surfaces of an arm rest and the width at the top of such arm rest so that such panel 35 covers the outside portion, the top portion and the inside portion of an arm rest with sufficient material left to be tucked into the space between the seat and arm rest of the article. The panel 35 is also composed of a portion 37 which forms an extension of portion 36, and which has a height greater than the height of the outer surface of an arm rest and a width to enable such portion to be drawn around to the back of the chair in overlapping relation with the outside of the back panel 10, as shown more clearly in FIG. 5 of the drawings. The top edge of panel portion 37 and the adjacent side edge of panel portion 36 are joined in a smooth curve; the material of the panel in the region of such curve being tucked in the space between the arm rest and the back of the article. Secured to the lower edge of panel 35 by means of a line of welting 38 is a skirt panel 39 having a height the same as skirt panel 31 and a length equal to the combined widths of portions 36 and 37 of such panel 35. Secured to the left hand side edges of panels 35 and 39, as viewed in FIG. 2 of the drawings, which edges define the front edges of the arm rest D, as viewed in FIG. 3 of the drawings, is a line of welting 40.

Figure 9:
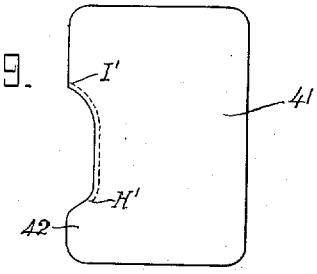
FIG. 9 is a plan view of the front face panel forming part of the arm rest cover.

The welting 40 between the points H—I thereof (note FIG. 2) connects to arm panel 35, a panel 41 for covering the front face of the arm. As shown more clearly in FIG. 9 of the drawings, the connected side of panel 41 is provided with an elongated cut-out which is secured by welting 40 to panel 35 between the points H′—I′, leaving the upper and lower portions of such connected side edge free from panel 35. Panel 41 has a width substantially greater than the width of the arm rest so that its free side edge may be placed under the front side edge of the part of panel portion 36 which covers the inside surface of the sofa arm, as indicated in FIGS. 3 and 4 of the drawings. The upper unconnected portion of panel 41 is adapted to be fitted snugly around the top front edge of the arm rest with the excess material underlying the front side edge of the part of panel portion 36 which covers the top of the arm rest, as is illustrated in FIG. 3 of the drawings. The lower free or unconnected portion of panel 41 extends below and is overlapped by an extension 26 of the seat panel 21 and by the skirt 31 thereof. The extension 42 on the lower free portion of panel 41 is drawn around the side edge of the arm rest to cover the outside of the arm rest and to afford a sliding surface for an extension 26 when the latter is wrapped around such lower free portion of panel 41 and underneath the lower end of the front side edge of the part of panel portion 36 which covers the outside surface of the arm rest, an dunderneath the skirt panel 39, as shown in FIGS. 3 and 4 of the drawings.

From the foregoing, it will be understood that in applying the slip cover to an upholstered article, the arm covers are preferably first assembled on the arm rests of the article. In accomplishing this, each arm cover is placed over the top of an arm rest, with the welting 40 at the front of the arm rest and the bottom of skirt panel 39 just touching the floor. The free side edges of the panels 41 and the upper free portion of such panels are inserted into the spaces between the seat and the arm rests and beneath the front side edge of the parts of panel portion 36 which cover the top and inside surfaces of the arms. Panel portions 36 are then drawn smoothly around the arms so that the welting 40 thereof frames the front faces of the arm rests. The peculiar shape of panel 41 enables a smooth fitting and conformance of panels 35 and 41, whether the arm rests have a curved shape as shown in the drawings, are rectangularly-shaped or have any other configuration used in the different styles of chairs. On curved arm rests such as shown, the panels 35 and 41 will readily conform to the curvature of such arms. When the arm rests are rectangular or otherwise shaped, the upper corner I′ and the upper free portion of the panel 41 may be tucked under and manipulated to obtain a smooth, close conformance to the configuration desired. The extension 42 of panel 41 as has been previously mentioned, is drawn around the outer side of the arm rest so that it lies beneath the lower end of panel portion 36 and the skirt 39. The top of panel portions 36 as viewed in FIG. 2 of the drawings, are then inserted in the spaces between the arm rests and the seats and the other side edge of the panel portions 36 and portions of the top edges of the panel portions 37 are inserted in the spaces between the arm rests and the back of the article. The panel portions 37 of the arm panels 35 are drawn around to the back of the article and secured thereto in any suitable fashion.

The body of the cover is then applied to the article by positioning the extensions 26 of panel 21 of such body so that the skirt panel 31 thereof is aligned with the skirt panels 39 of the arm rest covers, and with such extensions inserted through the openings between the portions 42 of arm panels 41 and the lower ends of panel portions 36 and skirt panels 39. The ends of the extensions are secured in this position in any suitable fashion. With the extensions so located, the strips 28, the ends of sections 22 of panel 21 and the side edges of panel portion 13 are tucked in the spaces between the seat and the arm rests. The panels 20, 20 and the expandable bellows are fitted to obtain a smooth fitting of the cover on the article. The panels 20, 20 are fitted in a manner similar to that explained with respect to the arm panels 41 and the bellows fitted in the manner previously explained. Suitable fastening members may be provided to maintain the panels 20, 20 in their adjusted position. The back panel 10 of the body of the cover is then fitted over the top and back of the article and over the folded back portions of panels 20, 20 and the panel portions 37 of the arm covers. The panel 10 is then secured in position by suitable fasteners to hold such panel in adjusted position.

While we have hereinabove described and illustrated a preferred embodiment of the invention, it will be understood by those skilled in the art that various changes and modifications may be made therein without departing from the spirit of the invention or the scope of the appended claims.

We claim:

1. A slip cover for an article of upholstered furniture *having a back, arms provided with front faces and a seat provided with a vertically disposed front face,* comprising covering portions for the back, arms and seat of the [chair] *article,* said arm covering portions including front panels for covering the front faces of the [chair] *article* arms, and said seat covering portions including a part adapted to overlie [the] *said vertically disposed* front face of the [chair] *article* seat and *said seat part* having ends [provided with longitudinally extending cuts dividing such ends] *divided* into [upper portions and lower] *separated relation lengthwise to provide when said part is in position on said vertically disposed front face of the article seat, separate upper and lower end* portions *extending longitudinally of such part and the front face of the article seat,* the length of said seat part [below the cuts], in the region of the lower end portions *thereof,* being substantially greater than the length *of said seat part* [thereof above the cuts,] in the region of the upper portions *thereof,* and such as to enable the lower end portions to extend across said front panels and to be drawn around to the outer sides of the [chair] *article* arms, and an elongated piece of fabric connected along one longitudinal side edge to [the edge of each cut from a point on the lower edge of an upper portion to a point on the upper edge of a lower portion] *each end of said seat part to enable it to extend between an associated pair of said upper and lower portions,* said fabric pieces having their other longitudinal [and] side edges free and being of such width as to cover *end portions of article seats which may be exposed between said pairs of upper and lower portions when the slip cover is mounted on* [the ends of chair] *article* seats which are longer than the distance between *the inner ends of* the [cuts] *pairs of said separated upper and lower portions.*

2. A slip cover as claimed in claim 1, wherein the material of the seat part between the inner ends of [the cuts] *said upper and lower portions* has a length less than the shortest seat in the range of [chair] *article* sizes for which the slip cover is designed, and wherein the legnth of the seat part [above the cuts,] in the region of the upper portions, is greater than the largest [chair] *article* seat for which the cover is designed, so that the free ends of such upper portions may be tucked in the spaces between the seat and arms of all [chairs] *articles* in the range of sizes for which the cover is designed.

3. A slip cover as claimed in claim 1, wherein nonstretchable corded weltings are provided on the upper edges of the lower end portions, and including means to secure the ends of such lower end portions under tension to the outer side of the [chair] *article,* the welted upper edges and the securing means maintaining such lower end portions in proper positions relative to the front panels, while permitting movement of such portions relative to such front panels when the user of the [chair] *article* sits down or gets up therefrom.

4. A slip cover for an article of upholstered furniture *having a back, arms provided with front faces and a seat provided with a vertically disposed front face,* comprising covering portions for the back, arms and seat of the [chair] *article,* said arm covering portions including front panels for covering the front faces of the [chair] *article* arms and main panels for covering the inside and outside surfaces of the [chair] *article* arms, a side edge of each front panel being connected to the front edge of each main panel and the bottom edge and lower portion of the other side edge of said front panel being free of said main panel, the lower portion of said front panel having a width greater than the width of the widest [chair] *article* arm in the range of [chair] *article* sizes for which the cover is designed, and said seat covering portions including a part adapted to overlie [the] *said vertically disposed* front face of the [chair] *article* seat and *said seat part* having ends [provided with longitudinally extending cuts dividing such ends] *divided* into [upper portions and lower] *separated relation lengthiwse to provide when said part is in position on said vertically disposed front face of the article seat, separate upper and lower end* portions *extending longitudinally of such part and the front face of the article seat,* the length of said seat part [below the cuts,] in the region of the lower end portions *thereof,* being substantially greater than the length *of said seat part* [thereof above the cuts,] in the region of the upper portions *thereof,* and such as to enable the lower end portions to extend across said front panels and to be drawn around to the outer sides of the [chair] *article* arms, said connected side edge of each front panel being connected to said main panel upwardly from a point spaced substantially upwardly from the bottom edge of said front panel to provide a free bottom portion, one side of such free bottom portion forming with the main panel a vertically disposed slitted opening through which a lower portion is drawn to be positioned between the outer side of the [chair] *article* arm and said main panel, one side edge of the free bottom portion of said front panel being formed to be located between such lower portion and the [chair] *article* arm in the assembled condition of the cover, and an elongated piece of fabric connected along one longitudinal side edge to [the edge of each cut from a point on the lower edge of an upper portion to a point on the upper edge of a lower portion] *each end of said seat part to enable it to extend between an associated pair of said upper and lower portions,* said fabric pieces having their other longitudinal [and] side edges free and being of such width as to cover *end portions of article seats which may be exposed between said pairs of upper and lower portions when the slip cover is mounted on* [the ends of chair] *article* seats which are longer than the distance between *the inner ends of* the [cuts] *pairs of said separated upper and lower portions.*

5. A slip cover for an article of upholstered furniture *having a back, arms provided with front faces and a seat provided with a vertically disposed front face,* comprising covering portions for the back, arms and seat of the [chair] *article, said arm covering portions including* front panels for covering the front faces of the [chair] *article* arms and main panels for covering the inside and outside surfaces of the [chair] *article* arms, a side edge of each front panel being connected to the front edge of each main panel and the remaining edges of such front panel being free from such main panel, the central portion only of such front panel being connected to the main panel and such central portion being susbtantially less in width than the free top and bottom portions thereof to form free extensions projecting laterally from a side edge of such front panel and being connected to said main panel along such side edge by a substantially curved edge portion, such extension being arranged to be drawn around the outer surfaces of the [chair] *article* arm, and said seat covering portions including a part adapted to overlie [the] *said vertically disposed* front face of the [chair] *article* seat and *said seat part* having ends [provided with longitudinally extending cuts dividing such ends] *divided* into [upper portions and lower] *separated relation lengthwise to provide when said part is in position on said vertically disposed front face of the article seat, separate upper and lower end* portions *extending longitudinally of such part and the front face of the article seat,* the length of said seat part [below the cuts,] in the region of the lower end portions *thereof,* being substantially greater than the length *of said seat part* [thereof above the cuts,] in the region of the upper portions *thereof,* and such as to enable the lower end portions to extend across said front panels and to be drawn around to the outer sides of the [chair] *article* arms, and an elongated piece of fabric connected along one longitudinal side edge to [the edge of each cut from a point on the lower edge of an upper portion to a point on the upper edge of a lower portion] *each end of said seat part to enable it to extend between an associated pair of said upper and lower portions,* said fabric pieces having their other longitudinal [and] side edges free and being of such width as to cover *end portions of article seats which may be exposed between said pairs of upper and lower portions when the slip cover is mounted on* [the ends of chair] *article* seats which are longer than the distance between *the inner ends of* the [cuts] *pairs of said separated upper and lower portions.*

6. A slip cover for an article of upholstered furniture *having a back, arms provided with front faces and a seat provided with a vertically disposed front face,* comprising covering portions for the back, arms and seat of the [chair] *article,* said arm covering portions including front panels for covering the front faces of the [chair] *article* arms, and said seat covering portions including a part adapted to overlie [the] *said vertically disposed* front face of the [chair] *article* seat and *said seat part* having ends [provided with longitudinally extending cuts dividing such ends] *divided* into [upper portions and lower] *separated relation lengthwise to provide when said part is in position on said vertically disposed front face of the article seat, separate upper and lower end* portions *extending longitudinally of such part and the front face of the article seat,* the length of said seat part [below the cuts,] in the region of the lower end portions *thereof,* being substantially greater than the length *of said seat part* [thereof above the cuts,] in the region of the upper portions *thereof,* and such as to enable the lower end portions to extend across said front panels and to be drawn around to the outer sides of the [chair] *article* arms, and an elongated piece of fabric connected along one longitudinal side edge to [the edge of each cut from a point on the lower edge of an upper portion to a point on the upper edge of a lower portion] *each end of said seat part to enable it to extend between an associated pair of said upper and lower portions,* said fabric pieces having their other longitudinal [and] side edges free and being of such width as to cover *end portions of article seats which may be exposed between said pairs of upper and lower portions when the slip cover is mounted on* [the ends of chair] *article* seats which are longer than the distance between *the inner ends of* the [cuts] *pairs of said separated upper and lower portions,* and said back covering portions including a front panel having substantially at the line of juncture between the part thereof above the article arms and the lower part thereof, aligned slits extending longitudinally inwardly from the side edges thereof and being of such length that the distance between the inner ends of such slits is approximately the same as the length of the shortest article back for which the slip cover is designed and the distance between the outer ends of such slits is greater than the length of the space between the arms of an article back having the largest length for which the slip cover is designed, the slits forming expandable bellows to enable such front of the back panel in the region of the tops of the article arms to be adjusted for articles having back of different lengths, the inner side edges of the slits being arranged in closed relation on long length article backs and such slits being spread open on short length article backs.

7. A slip cover as claimed in claim 6 wherein an elongated piece of fabric material is conected along one longitudinal side edge to the inside edge of each slit and is tuckable out of sight at the juncture between the back and arms of short length articles and is tuckable out of sight under the upper and lower parts of such front of the back panel when the slip cover is mounted on longer length articles.

8. A slip cover as claim in claim 6, wherein a pair of end panels for covering the ends of the article back are each secured along a side edge thereof to a side edge of the upper part of the front of the back panel so that the bottom free edge thereof forms a continuation of the upper inner edge of an associated slit, and wherein a strip of welting is secured to the free bottom edge of each end panel and extends into and is secured to the inside edges of the associated slit to enable the bottom edges of such end panels to be locked in the junctures of the arms and back of the article and to facilitate the proper adjustment of the slits on the article.

9. A slip cover for an article of upholstered furniture *having a back, arms provided with front faces and a seat provided with a vertically disposed front face,* comprising covering portions for the back, arms and seat of the [chair] *article,* said arm covering portions including front panels for covering the front faces of the [chair] *article* arms and main panels for covering the inside and outside surfaces of the [chair] *article* arms, a side edge of each front panel being connected to the front edge of each main panel and the remaining edges of such front panel being free from such main panel, the central portion only of such front panel being connected to the main panel to provide a free top portion and a free bottom portion, said free top and bottom portions having widths greater than the central portion of said front panel to provide free extensions which project laterally from the outer side edge of said front face panel and which extend into overlapping relation with spaced free portions of the front edge of said main panel on the [chair] *article,* and said seat covering portions including a part adapted to overlie [the] *said vertically disposed* front face of the [chair] *article* seat and *said seat part* having end extensions adapted to be drawn across the bottom portions of said front panels and around to the outer sides of the [chair] arms, said end extensions extending from points which define a length less than the shortest seat in the range of [chair] *article* sizes for which the slip cover is designed, to points which define a length greater than the largest seat in the range of [chair] *article* sizes for which the slip cover is designed, said free bottom portions of said front panels forming with said main panels vertically disposed slitted openings through which said extensions may be drawn to be located between the free extensions of said bottom portions and portions of said main panels covering the outside surfaces of the [chair] *article* arms.

10. A slip cover as claimed in claim 9, wherein nonstretchable corded weltings are provided along the upper and lower edges of each end extension from the points which define a length less than the shortest seat in the range of [chair] *article* sizes for which the slip cover is designed, to the outer ends of said end extensions, and including means to secure the outer ends of said end extensions under tension to the outer sides of the [chair] *article arms,* said welted edges and securing means enabling said end extensions to move relative to said front panels without substantially disturbing the latter in the use of the cover.

References Cited in the file of this patent or the original patent

UNITED STATES PATENTS

| | | |
|---|---|---|
| 2,123,667 | Trubitz | July 12, 1938 |
| 2,179,805 | Trubitz | Nov. 14, 1939 |
| 2,195,039 | Shauer | Mar. 26, 1940 |
| 2,469,520 | Roberts | May 10, 1949 |
| 2,667,211 | Krasnov et al. | Jan. 26, 1954 |
| 2,671,499 | Reavis et al. | Mar. 9, 1954 |